US012300880B2

(12) United States Patent
Ding et al.

(10) Patent No.: US 12,300,880 B2
(45) Date of Patent: May 13, 2025

(54) QUASI-OMNIDIRECTIONAL ANTENNA AND SIGNAL TRANSCEIVER

(71) Applicant: HUAWEI TECHNOLOGIES CO., LTD., Guangdong (CN)

(72) Inventors: Feng Ding, Suzhou (CN); Xinghui Ji, Suzhou (CN); Shimin Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 179 days.

(21) Appl. No.: 18/057,229

(22) Filed: Nov. 28, 2022

(65) Prior Publication Data

US 2023/0077791 A1 Mar. 16, 2023

Related U.S. Application Data

(63) Continuation of application No. PCT/CN2020/125915, filed on Nov. 2, 2020.

(30) Foreign Application Priority Data

May 21, 2020 (CN) ........................ 202010438202.X

(51) Int. Cl.
*H01Q 1/42* (2006.01)
*H01Q 1/22* (2006.01)
*H01Q 1/24* (2006.01)
*H01Q 1/36* (2006.01)

(52) U.S. Cl.
CPC ............. *H01Q 1/42* (2013.01); *H01Q 1/2291* (2013.01); *H01Q 1/246* (2013.01); *H01Q 1/36* (2013.01)

(58) Field of Classification Search
CPC ................... H01Q 1/2291; H01Q 1/24; H01Q 1/241-243; H01Q 1/36; H01Q 1/42; H01Q 21/205; H01Q 21/29
See application file for complete search history.

(56) References Cited

U.S. PATENT DOCUMENTS 4,864,320 A * 9/1989 Munson ................. H01Q 19/06 343/834
9,761,931 B2 * 9/2017 Huang ................. H01Q 1/2291
11,824,266 B2 * 11/2023 Fasenfest ............. H01Q 1/2291
(Continued)

FOREIGN PATENT DOCUMENTS

CN 102800248 A 11/2012
CN 103996356 A 8/2014
(Continued)

*Primary Examiner* — Jason M Crawford

(57) ABSTRACT

A quasi-omnidirectional antenna and a signal transceiver are provided. The quasi-omnidirectional antenna includes a housing having a metal rear cover facing a boundary of an installation area and a front cover disposed opposite to the metal rear cover. A forward facing antenna is disposed in the housing and is configured to radiate in a direction away from the metal rear cover. First and second side antennas are disposed in the housing, with the first side antenna and the second side antenna being oppositely disposed on two sides of the forward facing antenna. Each side antenna includes a metallic ground that is signal-connected to the metal rear cover. An overlapping area extends between the radiation area of each side antenna and a radiation area of the forward facing antenna.

18 Claims, 15 Drawing Sheets

(56) References Cited

U.S. PATENT DOCUMENTS

| | | | |
|---|---|---|---|
| 2004/0140940 | A1 | 7/2004 | Vothknecht et al. |
| 2005/0156804 | A1 | 7/2005 | Ratni et al. |
| 2008/0278405 | A1* | 11/2008 | Montgomery ......... H01Q 1/243 343/893 |
| 2009/0315788 | A1 | 12/2009 | Hirota |
| 2014/0118196 | A1 | 5/2014 | Koskiniemi |
| 2015/0120189 | A1* | 4/2015 | Giometti ............ G01R 29/0807 342/450 |
| 2017/0047665 | A1* | 2/2017 | Yang .................... H01Q 19/005 |
| 2017/0094460 | A1 | 3/2017 | Warren et al. |
| 2017/0317409 | A1 | 11/2017 | Ayatollahi et al. |
| 2020/0373648 | A1* | 11/2020 | Lin ........................ H01Q 1/243 |
| 2021/0043999 | A1* | 2/2021 | Da Costa Bras Lima .................. H01Q 1/48 |
| 2023/0077791 | A1* | 3/2023 | Ding ........................ H01Q 1/42 343/872 |
| 2024/0113450 | A1* | 4/2024 | Neenan .................. H01Q 21/24 |
| 2024/0305017 | A1* | 9/2024 | Ng ........................... H01Q 1/42 |

FOREIGN PATENT DOCUMENTS

| | | | |
|---|---|---|---|
| CN | 104134861 | A | 11/2014 |
| CN | 104425874 | A | 3/2015 |
| CN | 108736136 | A | 11/2018 |
| CN | 109075451 | A | 12/2018 |
| CN | 208385639 | U | 1/2019 |
| CN | 110911851 | A | 3/2020 |
| JP | 2005519508 | A | 6/2005 |
| JP | 2009124577 | A | 6/2009 |
| JP | S679120 | B1 | 4/2020 |
| KR | 100732666 | B1 | 6/2007 |
| WO | 2017191811 | A1 | 11/2017 |

* cited by examiner

QUASI-OMNIDIRECTIONAL ANTENNA AND SIGNAL TRANSCEIVER

CROSS-REFERENCE TO RELATED APPLICATIONS

This application is a continuation of International Application No. PCT/CN2020/125915 filed on Nov. 2, 2020, which claims priority to Chinese Patent Application No. 202010438202.X filed on May 21, 2020. The disclosures of the aforementioned applications are hereby incorporated by reference in their entireties.

TECHNICAL FIELD

This disclosure relates to the field of antenna technologies, and in particular, to a quasi-omnidirectional antenna and a signal transceiver.

BACKGROUND

An antenna system made of an omnidirectional antenna is usually used in an outdoor wireless local area network (WLAN) coverage scenario. An omnidirectional antenna refers to an antenna that implements even radiation on a plane, and an antenna system refers to a system in which an antenna radiates electromagnetic waves to surrounding space. The omnidirectional antenna is cost-effective and convenient because it can be directly installed.

In an actual application of the omnidirectional antenna, because a user hopes that an antenna apparatus formed by the omnidirectional antenna is more appealing and is not easily and directively noticed, during installation, the antenna apparatus is usually mounted on a wall or is disposed on a boundary of a field by using a pole. Moreover, the omnidirectional antenna of the antenna apparatus is designed to be “hidden”. To maintain a high gain of the omnidirectional antenna, in some antenna apparatus, omnidirectional antennas have to be integrated into products. As shown in FIG. 1, four omnidirectional antennas 02 are directly disposed on one end of a columnar main body 01 along a direction a, to form a structure shown in FIG. 2. In addition, as shown in FIG. 3, a camouflage cover 03 is used to cover the antennas. It can be learned from the structures shown in FIG. 1, FIG. 2, and FIG. 3 that, although an antenna apparatus uses the camouflage cover 03 to cover the omnidirectional antenna 02 on the one end of the columnar main body 01, and the omnidirectional antenna 02 is placed inside the product, an overall length of the product is extended by the omnidirectional antenna 02, and dimensions of a whole antenna apparatus product are increased. Therefore, the whole antenna apparatus product is more obvious. On the contrary, when the overall dimensions of the antenna apparatus need to be controlled, the antenna apparatus has less space reserved for antenna installation. As a result, the length of the omnidirectional antenna is limited, and the reduced length of the omnidirectional antenna leads to too small antenna gain. In addition, when a plurality of groups of omnidirectional antennas are placed in a small installation space, the antennas and circuit boards may interfere with each other to produce a phenomenon of blocking or reflection.

In conclusion, a high antenna gain leads to increased dimensions of the antenna apparatus, while a low antenna gain leads to decreased dimensions of the antenna apparatus.

Therefore, two requirements, namely, miniaturization of the antenna apparatus and high antenna gain, cannot be met at the same time.

SUMMARY

This disclosure provides a quasi-omnidirectional antenna and a signal transceiver, to ensure a high antenna gain while reducing dimensions of an antenna apparatus.

According to one aspect, this a quasi-omnidirectional antenna is provided that may be directly mounted on a wall, or may be disposed in an installation area by using a mounting pole. Optionally, when the installation area is a playground, the quasi-omnidirectional antenna is usually installed at a boundary of the playground. Due to impact of crowd distribution and a mounting pole body, implementing backward radiation for the antenna does not provide any practical benefit. Based on this, when the installation area is the playground, the quasi-omnidirectional antenna may be mounted on a pole by erecting the pole at the boundary of the installation area. In this case, a metal rear cover in the quasi-omnidirectional antenna faces the boundary of the installation area, and correspondingly, a front cover disposed opposite to the metal rear cover faces an interior of the installation area. For two side antennas that are oppositely disposed on two sides of a forward facing antenna, a metallic ground of each of the two side antennas is signal-connected to the metal rear cover. The metal rear cover forms part of the metallic ground of the side antenna, and this structure can expand a total area of the metallic ground in the side antenna, so that the metal rear cover also participates in radiation. In this case, energy radiated by each side antenna is distributed in an area between the metal rear cover and the boundary of the installation area, instead of being reflected by the metal rear cover. Based on this, an overlapping area is formed between a radiation area of each side antenna and a radiation area of the forward facing antenna, to avoid a radiation gap between the side antenna and the forward facing antenna, and improve a gain of the quasi-omnidirectional antenna.

The quasi-omnidirectional antenna includes two side antennas and one forward facing antenna. The side antenna and the forward facing antenna can meet a miniaturization requirement of the antenna apparatus as long as internal space of a housing is properly used during disposition. A metallic ground of each side antenna is connected to the metal rear cover so that the metal rear cover also participates in radiation and no longer reflects energy generated by the side antenna. In this case, the energy radiated by each side antenna is distributed on both a front side and a rear side. This expands a distribution scope of energy radiated by each side antenna, and improves the gain of the quasi-omnidirectional antenna.

The specific disposition of the quasi-omnidirectional antenna is based on radial symmetry characteristics of a planar inverted F antenna (PIFA) on both sides of a radiation center of the planner inverted F antenna. Optionally, both a first side antenna and a second side antenna are PIFA antennas, and radiation of the forward facing antenna is set to range from 60° to 80° to avoid a radiation gap between the side antenna and the forward facing antenna and improve the gain of the quasi-omnidirectional antenna. Shapes and sizes of a first overlapping area and a second overlapping area may be the same or different. This is not limited herein.

When the metallic ground of each side antenna and the metal rear cover are specifically disposed, in a possible implementation, the metallic ground of the side antenna is directly lapped to the metal rear cover. In another possible implementation, the metallic ground of the side antenna is coupled to the metal rear cover. Optionally, a signal connection manner between a metallic ground of the first side antenna and the metal rear cover is either of the foregoing two manners. Likewise, optionally, a signal connection manner between a metallic ground of the second side antenna and the metal rear cover is either of the foregoing two manners. That is, in each quasi-omnidirectional antenna, the connection manner between the metallic ground of the first side antenna and the metal rear cover and the connection manner between the metallic ground of the second side antenna and the metal rear cover may be the same or different. When the metallic ground of the side antenna is coupled to the metal rear cover, a gap less than 1 millimeter (mm) needs to be formed between the metallic ground and the metal rear cover.

When the forward facing antenna and the side antenna are specifically disposed, a quantity of forward units included in the forward facing antenna and a quantity of side antenna units included in each side antenna may be set according to a requirement. Specifically, each forward unit includes one or more forward facing antenna units, and similarly, each side antenna includes one or more side antenna units. When the forward facing antenna includes more than one unit and/or each side antenna includes more than one unit, the quasi-omnidirectional antenna may satisfy a multiple input and multiple output (MIMO) technology. This technology can make full use of space resources and implement multiple input and multiple output by using the quasi-omnidirectional antenna, so that a system channel capacity can be doubled without increasing a frequency spectrum resource and antenna transmit power.

According to another aspect, this application further provides a signal transceiver. The signal transceiver includes a quasi-omnidirectional antenna, where the quasi-omnidirectional antenna is any quasi-omnidirectional antenna in the foregoing technical solutions. The quasi-omnidirectional antenna includes two side antennas and one forward facing antenna. During disposition of the side antenna and the forward facing antenna, internal space of a housing is properly used to meet a miniaturization requirement of an antenna apparatus. In addition, in the quasi-omnidirectional antenna, a metallic ground of each side antenna is connected to a metal rear cover, so that the metal rear cover also participates in radiation and no longer reflects energy generated by the side antenna. In this case, the energy radiated by each side antenna is distributed on both a front side and a rear side. This expands a distribution scope of energy radiated by each side antenna, and improves a gain of the quasi-omnidirectional antenna in the signal transceiver.

DESCRIPTION OF EMBODIMENTS

First, an application scenario of this disclosure is described. Based on advantages of a cost-effectiveness and easy installation of an omnidirectional antenna, the omnidirectional antenna is usually used in an outdoor WLAN coverage scenario. Currently, the omnidirectional antenna is placed inside an antenna apparatus, to beautify the antenna apparatus and meet an ornamental requirement of a user. However, in the antenna apparatus, when the omnidirectional antenna is integrated into the antenna apparatus, if a high antenna gain needs to be maintained, dimensions of the antenna apparatus cannot be reduced, and if an overall miniaturization of the antenna apparatus needs to be maintained, the high antenna gain cannot be ensured.

Based on the foregoing application scenario, an embodiment provides a quasi-omnidirectional antenna, to ensure the high antenna gain while reducing dimensions of the antenna. The quasi-omnidirectional antenna may be directly mounted on a wall, or may be disposed in an installation area by using a mounting pole. For example, when the installation area is a playground, due to impact of crowd distribution and a mounting pole body, implementing backward radiation for the antenna does not provide any practical benefit. Based on this, the quasi-omnidirectional antenna may be mounted on a pole by erecting the pole at the boundary of the installation area.

To make objectives, technical solutions, and advantages of this disclosure more clear, the following description provides further details with reference to the accompanying drawings.

Terms used in the following embodiments of this disclosure are merely intended to describe specific embodiments, but are not intended to be limiting. Terms “one”, “a”, “the”, “the foregoing”, “this”, and “the one” of singular forms used in this specification and the appended claims are also intended to include plural forms like “one or more”, unless otherwise specified in the context clearly. The terms “include”, “comprise”, “have”, and their variants all mean “include but are not limited to”, unless otherwise specifically emphasized.

Figure 1:
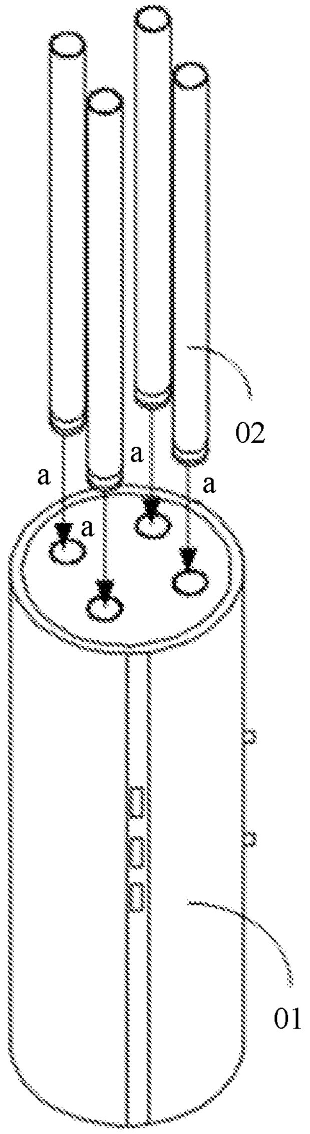
(Prior art) FIG. 1
FIG. 1 is a schematic structural diagram of an antenna product.
Figure 2:
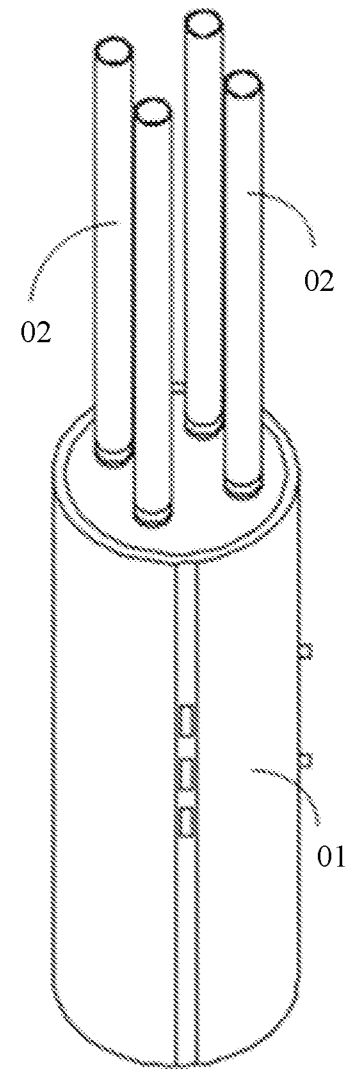
(Prior art) FIG. 2
FIG. 2 is a schematic structural diagram of an antenna product.
Figure 3:
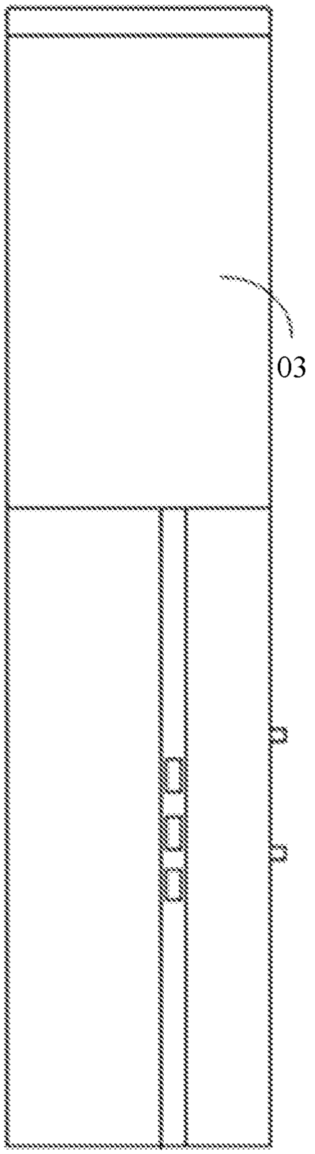
(Prior art) FIG. 3
FIG. 3 is a schematic structural diagram of an antenna product.
Figure 4:
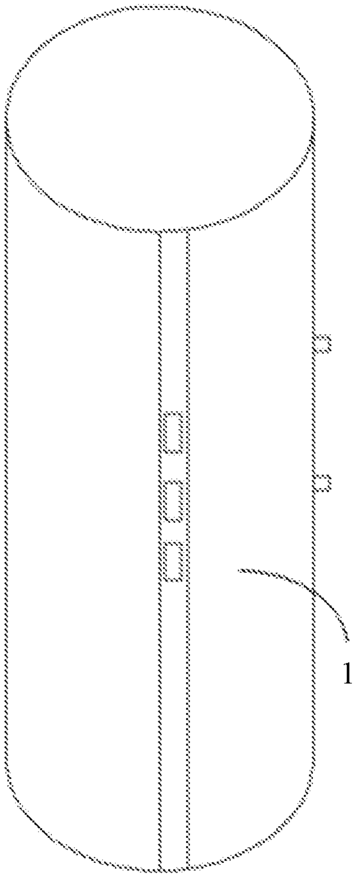
FIG. 4 is a schematic structural diagram of a quasi-omnidirectional antenna according to an embodiment of this disclosure.
Figure 5:
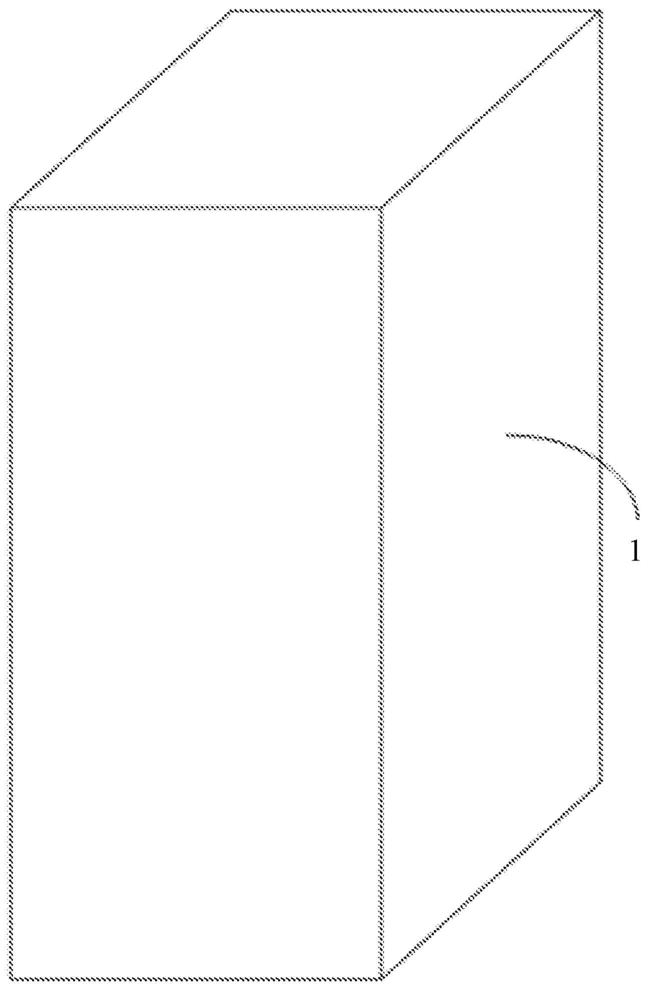
FIG. 5 is a schematic structural diagram of a quasi-omnidirectional antenna according to an embodiment of this disclosure.
Figure 6:
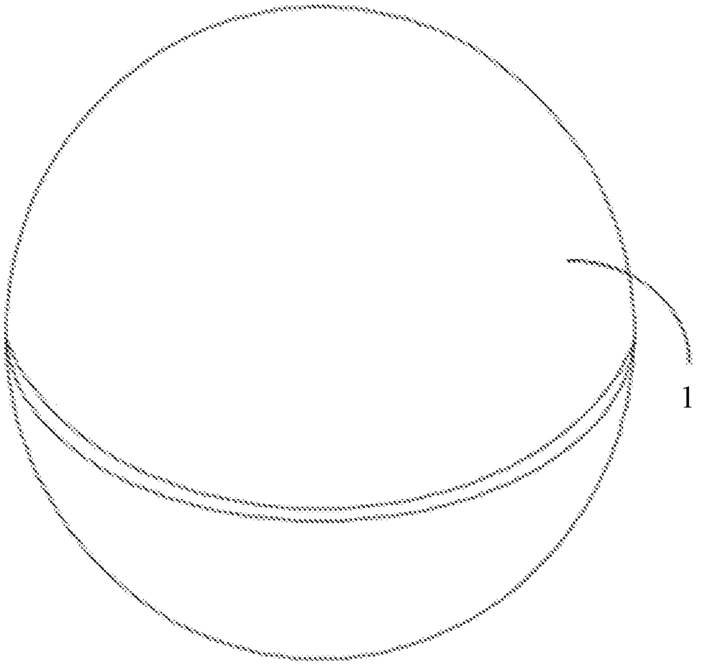
FIG. 6 is a schematic structural diagram of a quasi-omnidirectional antenna according to an embodiment of this disclosure.
Figure 7:
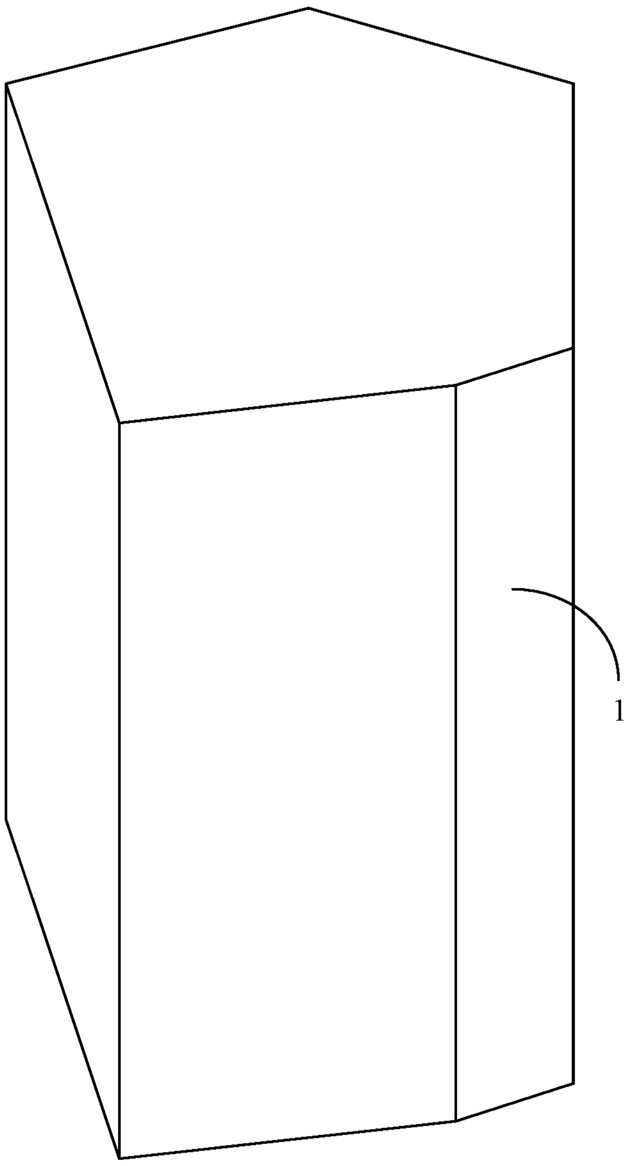
FIG. 7 is a schematic structural diagram of a quasi-omnidirectional antenna according to an embodiment of this disclosure.
Figure 8:
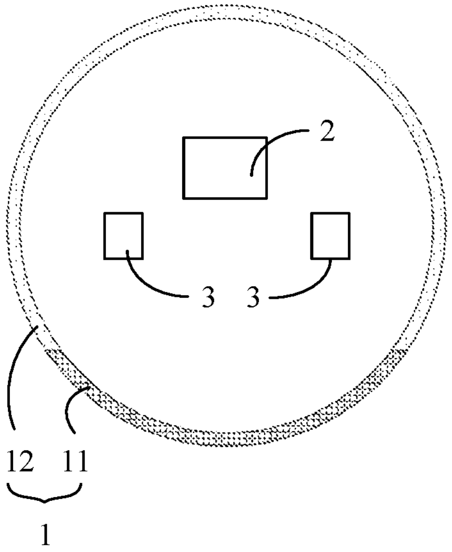
FIG. 8 is a schematic diagram of an internal structure of the quasi-omnidirectional antenna corresponding to FIG. 4.

Embodiments of this disclosure provide a quasi-omnidirectional antenna. Optionally, a shape of a housing 1 of the quasi-omnidirectional antenna is a cylinder shown in FIG. 4, a cuboid shown in FIG. 5, a sphere shown in FIG. 6, or an irregular shape shown in FIG. 7. Certainly, the shape of the housing 1 may alternatively be another shape, and details are not described herein. An example in which the housing 1 of the quasi-omnidirectional antenna is the cylinder shown in FIG. 4 is used for description. FIG. 8 is a schematic diagram of an internal structure of the quasi-omnidirectional antenna corresponding to FIG. 4. In the structure shown in FIG. 8, the quasi-omnidirectional antenna provided in this embodiment includes a cylindrical housing 1, a forward facing antenna 2, and two side antennas 3 disposed on two sides of the forward facing antenna 2. The housing 1 is formed by two parts. One part is a metal rear cover 11 configured to face a boundary of an installation area. The metal rear cover 11 facilitates heat dissipation, and the metal rear cover 11 also cooperates with a front cover 12 to form an enclosed structure. The other part is the front cover 12. Optionally, the front cover 12 may be made of plastic, or may be made of another material such as metal. It should be understood that a manner of cooperation between the front cover 12 and the metal rear cover 11 is not limited to the structure depicted in the figure.

Figure 9:
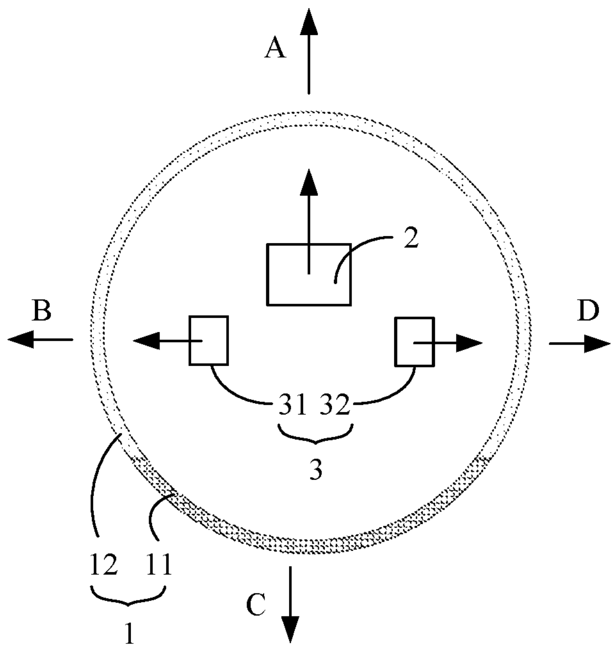
FIG. 9 is a schematic diagram of an internal structure of the quasi-omnidirectional antenna corresponding to FIG. 4.

In a structure shown in FIG. 9, one forward facing antenna 2, one first side antenna 31, and one second side antenna 32 are disposed in the housing 1 provided in this embodiment. The three antennas are all disposed inside the housing 1, and the three antennas are properly arranged in space so that dimensions of the housing 1 can be reduced. In this way, dimensions of the quasi-omnidirectional antenna can be reduced. To facilitate clear description of the structure of the quasi-omnidirectional antenna, a direction A is referred to as a front side of the housing 1, a direction C is referred to as a rear side of the housing 1, a direction B is referred to as a left side of the housing 1, and a direction D is referred to as a right side of the housing 1. In addition, it is stipulated that a radiation direction of the forward facing antenna 2 in a radiation center is toward the direction A, a radiation direction of the first side antenna 31 in the radiation center is toward the direction B, and a radiation direction of the second side antenna 32 in the radiation center is toward the direction D. It should be understood that the stipulation herein is merely for clear description of the quasi-omnidirectional antenna. In an actual application, the radiation direction of the forward facing antenna 2 in the radiation center, the radiation direction of the first side antenna 31 in the radiation center and the radiation direction of the second side antenna 32 in the radiation center may be changed according to a design requirement, and are not limited to the foregoing structure. With reference to the foregoing specific structure, description is provided by using an example in which both the first side antenna 31 and the second side antenna 32 are PIFA antennas.

Figure 10:
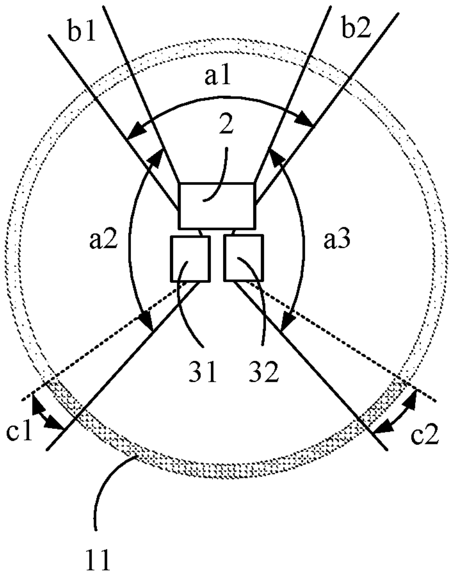
FIG. 10 is a schematic diagram of a radiation angle of a quasi-omnidirectional antenna corresponding to the structure in FIG. 9.
Figure 11:
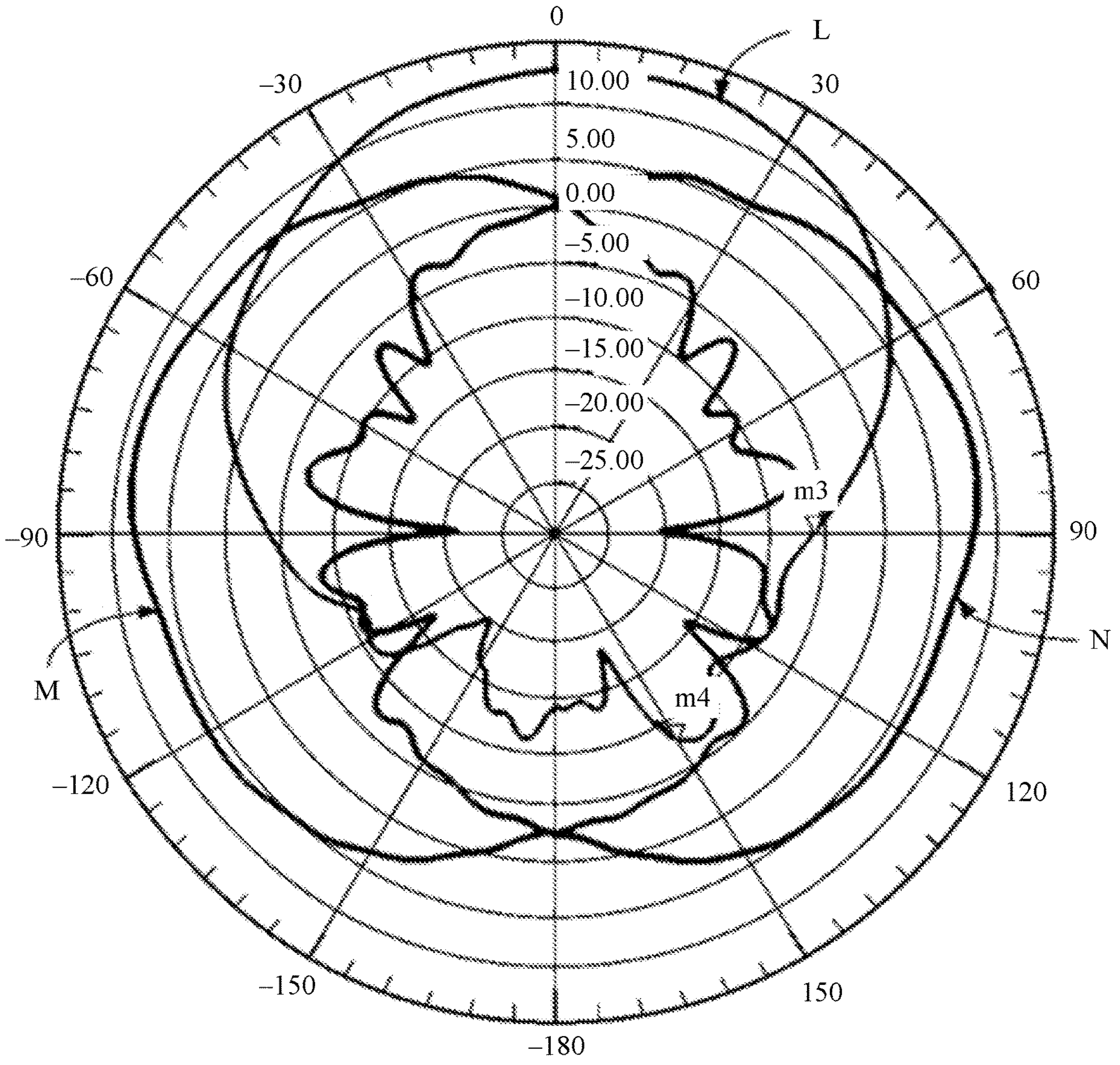
FIG. 11 is a pattern of a quasi-omnidirectional antenna according to an embodiment of this disclosure.
Figure 12:
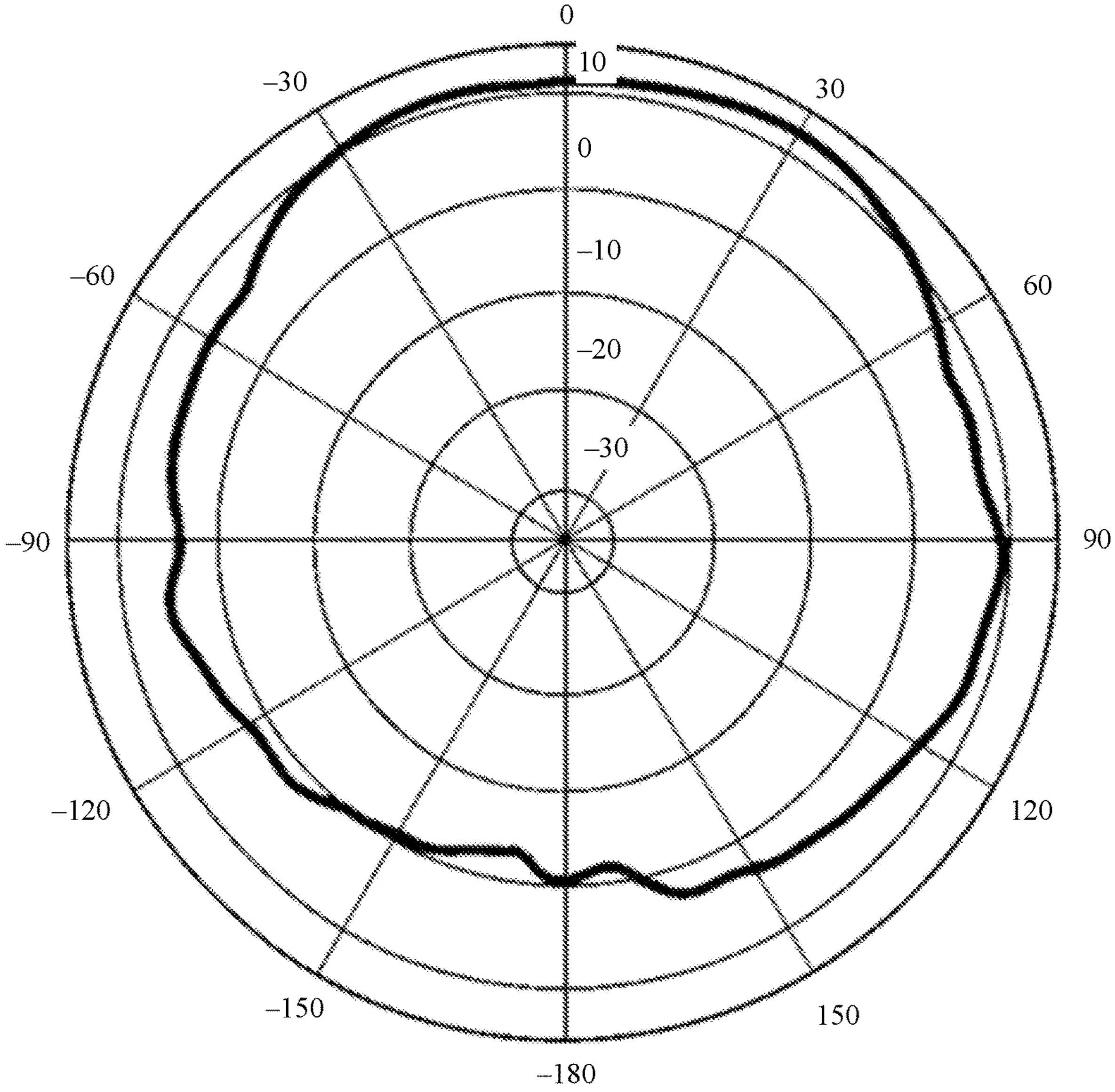
FIG. 12 is a tested combined pattern of the quasi-omnidirectional antenna corresponding to FIG. 11.

FIG. 10 is a schematic diagram of a radiation angle of a quasi-omnidirectional antenna corresponding to the structure in FIG. 9. Refer to FIG. 10. A radiation angle of the forward facing antenna 2 is a1, where a1 may range from 60° to 80°. A radiation angle scope of the first side antenna 31 is a2, where a2 may range from 0° to 180°. Similarly, a radiation angle scope of the second side antenna 32 is a3, where a3 may range from 0° to 180°. Specifically, in the quasi-omnidirectional antenna provided in this embodiment of this application, a metallic ground of the first side antenna 31 is signal-connected to the metal rear cover 11. The metal rear cover 11 is used as a part of the metallic ground of the first side antenna 31. This expands an area of the metallic ground of the first side antenna 31. In this case, energy radiated by the first side antenna 31 towards the rear side, that is, energy in a scope of c1, is no longer reflected by the metal rear cover 11. A signal connection manner may be a direct lapping manner, or a coupling manner in which a gap between the metallic ground of the first side antenna 31 and the metal rear cover 11 is less than 1 mm may be disposed. Similarly, based on a same principle, energy radiated by the second side antenna 32 toward the rear side, that is, energy in a scope of c2, is no longer reflected by the metal rear cover 11. In addition, it should be understood that a size of a3 and a size of a2 may be the same or different. When a3 and a2 are specifically disposed, to avoid a radiation gap between the first side antenna 31 and the forward facing antenna 2 and/or a radiation gap between the second side antenna 32 and the forward facing antenna 2, there is a first overlapping area b1 between a radiation area of the first side antenna 31 and a radiation area of the forward facing antenna 2, and there is a second overlapping area b2 between a radiation area of the second side antenna 32 and the radiation area of the forward facing antenna 2. It should be understood that a size of b1 and a size of b2 may be the same or different. With reference to FIG. 10, refer to FIG. 11. FIG. 11 is a radiation pattern of the quasi-omnidirectional antenna. An area enclosed by a line L is formed by radiation of the forward facing antenna 2, an area enclosed by a line M is formed by radiation of the first side antenna 31, and an area enclosed by the line N is formed by radiation of the second side antenna 32. Specifically, as shown in FIG. 10 and FIG. 11, radiation energy of the first side antenna 31 and the second side antenna 32 is distributed on both a front side and a rear side. This expands a distribution scope of the radiation energy of the first side antenna 31 and the second side antenna 32. Based on this, FIG. 12 is a tested combined pattern of the quasi-omnidirectional antenna corresponding to FIG. 11. It can be learned from FIG. 12 that a distribution scope of energy of the quasi-omnidirectional antenna provided in this embodiment of this application is wide, and a gain of the quasi-omnidirectional antenna can be improved.

Figure 13:
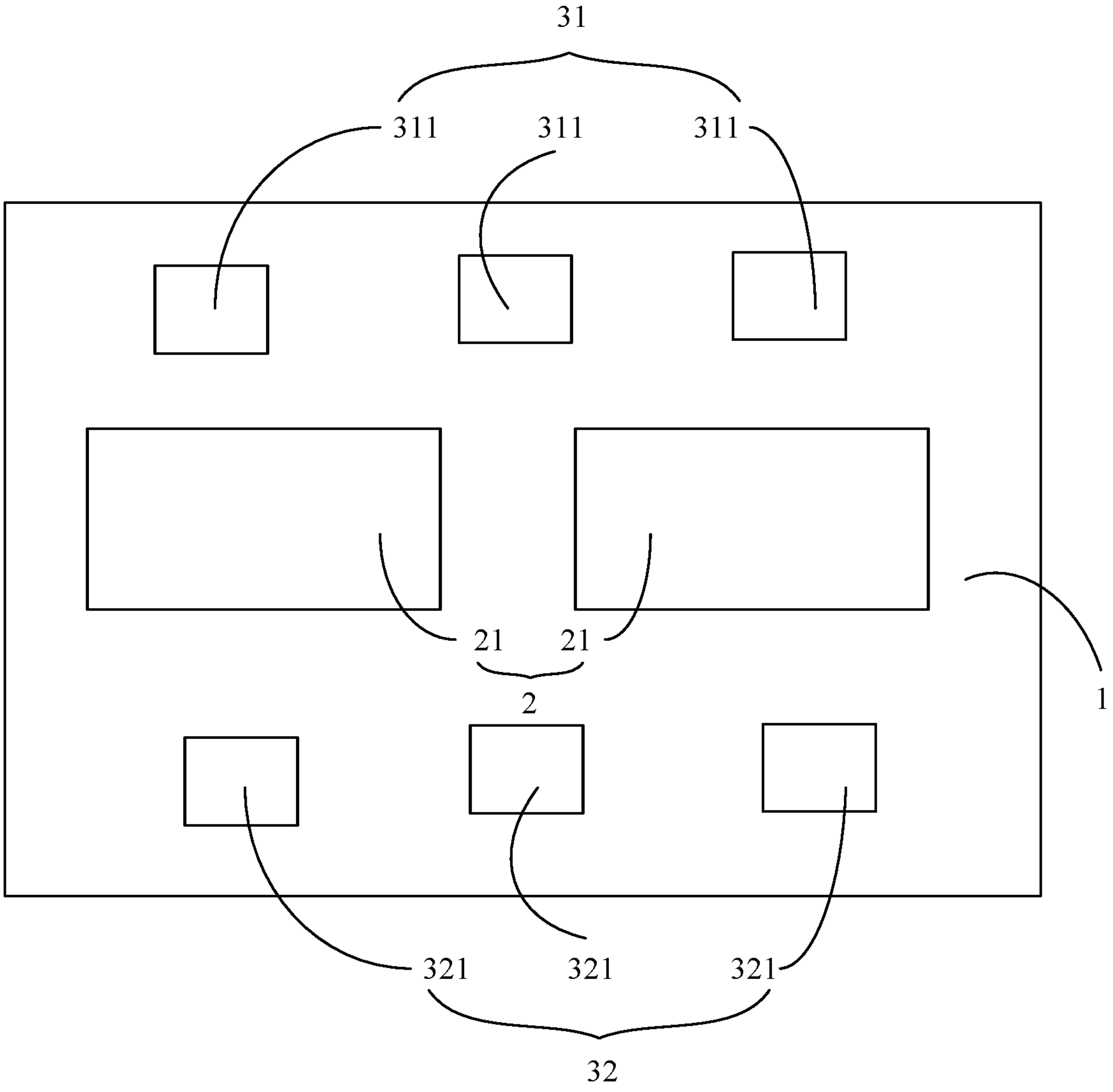
FIG. 13 is a cross sectional schematic view of the structure in FIG. 4 along an extension direction.

Optionally, as shown in FIG. 13, in the housing 1 of the quasi-omnidirectional antenna provided in this embodiment, the forward facing antenna 2 may include one or more forward facing antenna units 21. The first side antenna 31 may include one or more first side antenna units 311, and each first side antenna unit 311 is one PIFA antenna. It should be understood that a plurality of first side antenna units 311 may use different PIFA antennas, that is, each PIFA antenna may change according to a use requirement. Similarly, the second side antenna 32 may include one or more second side antenna units 321, and each second side antenna unit 321 is one PIFA antenna. A plurality of second side antenna units 321 may also use different PIFA antennas, that is, each PIFA antenna may change according to a use requirement. There are a plurality of specific implementations for setting the foregoing quantities, including but not limited to the following several implementations.

Figure 14:
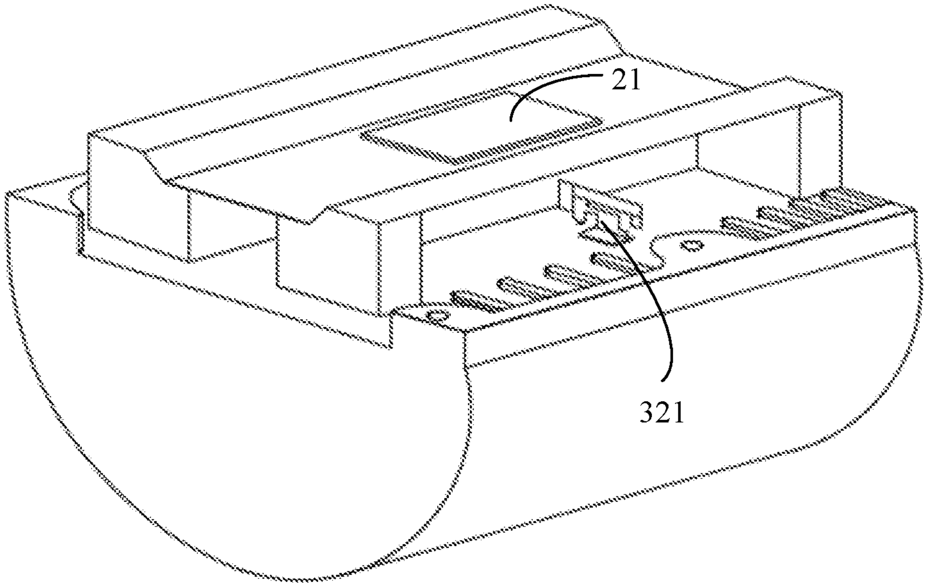
FIG. 14 is a schematic diagram of an internal structure of a quasi-omnidirectional antenna according to an embodiment of this disclosure.

Implementation 1: With reference to FIG. 13, refer to FIG. 14. The forward facing antenna 2 in the housing 1 includes one forward facing antenna unit 21, the first side antenna 31 includes one first side antenna unit 311 (not shown in FIG. 14 due to perspective of view), and the second side antenna 32 includes one second side antenna unit 321.

Implementation 2: This implementation is formed based on the implementation 1. A difference between the implementation 1 and the implementation 2 lies in that the second side antenna 32 includes a plurality of second side antenna units 321.

Implementation 3: This implementation is formed based on the implementation 1. A difference between the implementation 1 and the implementation 3 lies in that the first side antenna 31 includes a plurality of first side antenna units 311.

Implementation 4: This implementation is formed based on the implementation 1. Differences between the implementation 1 and the implementation 4 lie in that the first side antenna 31 includes a plurality of first side antenna units 311 and the second side antenna 32 includes a plurality of second side antenna units 321.

With reference to FIG. 13, in the foregoing implementations 1 to 4, only one or more changes are made to a quantity of first side antenna units 311 included in the first side antenna 31 and a quantity of second side antenna units 321 included in the second side antenna 32 that are disposed in the housing 1. In addition, the forward facing antenna 2 is always controlled to include one forward facing antenna unit 21. It should be understood that, when the forward facing antenna 2 includes a plurality of forward facing antenna units 21, there are the following several implementations.

Implementation 5: This implementation is formed based on the implementation 1. A difference between the implementation 1 and the implementation 5 lies in that the forward facing antenna 2 includes a plurality of forward facing antenna units 21.

Implementation 6: This implementation is formed based on the implementation 2. A difference between the implementation 2 and the implementation 6 lies in that the forward facing antenna 2 includes a plurality of forward facing antenna units 21.

Implementation 7: This implementation is formed based on the implementation 3. A difference between the implementation 3 and the implementation 7 lies in that the forward facing antenna 2 includes a plurality of forward facing antenna units 21.

Implementation 8: This implementation is formed based on the implementation 4. A difference between the implementation 4 and the implementation 8 lies in that the forward facing antenna 2 includes a plurality of forward facing antenna units 21.

It should be noted that the foregoing implementation 5 changes a quantity of forward facing antenna units 21 included in the forward facing antenna 2 in the implementation 1 from "one" to a plurality, which is only a change in quantity and is therefore not shown in the figure. Similarly, the foregoing implementation 6 changes a quantity of forward facing antenna units 21 included in the forward facing antenna 2 in the implementation 2 from "one" to a plurality, which is only a change in quantity and is therefore not shown in the figure. Similarly, the foregoing implementation 7 changes a quantity of forward facing antenna units 21 included in the forward facing antenna 2 in the implementation 3 from "one" to a plurality, which is only a change in quantity and is therefore not shown in the figure. Similarly, the foregoing implementation 8 changes a quantity of forward facing antenna units 21 included in the forward facing antenna 2 in the implementation 4 from "one" to a plurality, which is only a change in quantity and is therefore not shown in the figure.

It should be noted that "a plurality of" in the foregoing implementations refers to any integer greater than 1. It should be understood that "a plurality of" corresponding to the forward facing antenna 2, "a plurality of" corresponding to the first side antenna 31, and "a plurality of" corresponding to the second side antenna 32 may be the same or different. When the "a plurality of" corresponding to each of the forward facing antenna 2, the first side antenna 31, and the second side antenna 32 is set to any integer greater than 1, a plurality of specific implementations may be further formed based on a combination of the implementation 2 to the implementation 8. For example, the first side antenna 31 includes two first side antenna units 311, the second side antenna 32 includes three second side antenna units 321, and the forward facing antenna 2 includes five forward facing antenna units 21. Details are not described herein again.

It should be noted that, when multiple values in the implementations are set to any integer greater than 1, the quasi-omnidirectional antenna meets MIMO. This technology can make full use of space resources and implement multiple input and multiple output by using the quasi-omnidirectional antenna, so that a system channel capacity can be doubled without increasing a frequency spectrum resource and antenna transmit power.

Figure 15:
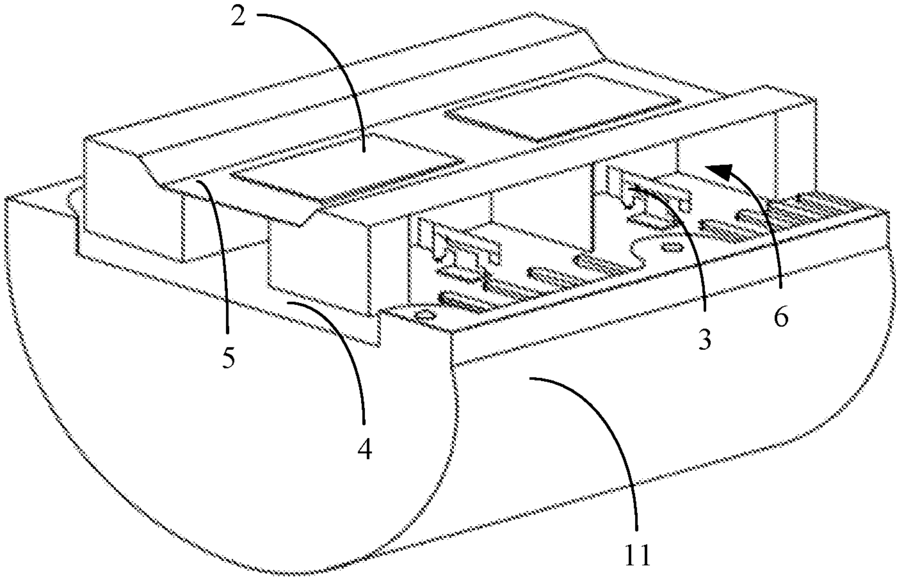
FIG. 15 is a schematic diagram of an internal structure of a quasi-omnidirectional antenna according to an embodiment of this disclosure.

When the quasi-omnidirectional antenna provided in this embodiment is specifically disposed, FIG. 15 is a cross sectional schematic view of the structure in FIG. 4 along an extended length direction of a columnar housing 1. With reference to FIG. 4 and to FIG. 15, a first mounting plate 4 and a second mounting plate 5 may be disposed inside the housing 1, and the second mounting plate 5 is disposed, by using a support structure, on a side that is of the first mounting plate 4 and that is away from the metal rear cover 11. Amounting surface for mounting the forward facing antenna 2 is formed on a side that is of the second mounting plate 5 and that is away from the metal rear cover 11, and a receptacle 6 for placing the side antenna 3 is formed between the second mounting plate 5 and the first mounting plate 4.

Figure 16:
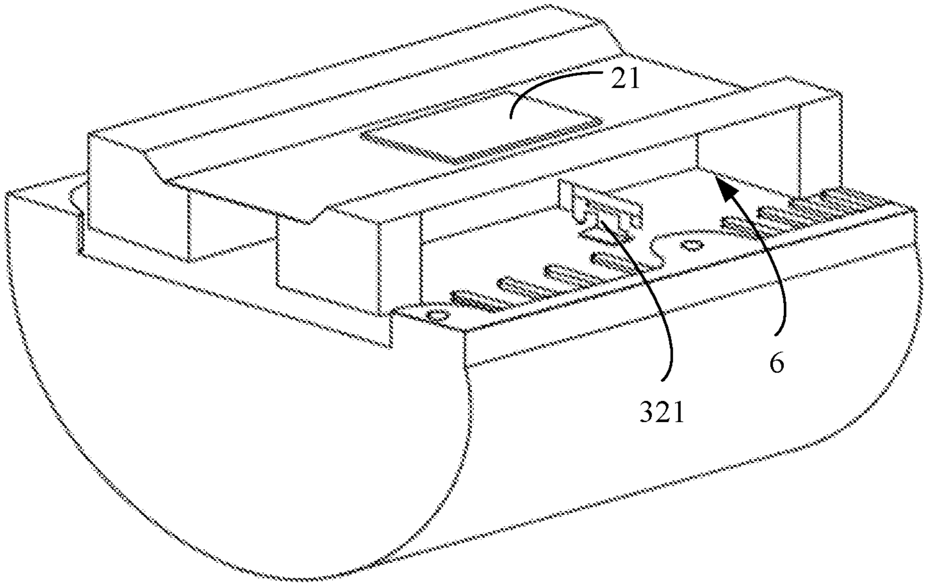
FIG. 16 is a schematic diagram of an internal structure of a quasi-omnidirectional antenna according to an embodiment of this disclosure.

In addition, the receptacle 6 herein should be in a one-to-one correspondence with the side antenna 3. For example, in a structure shown in FIG. 16, when there are one forward facing antenna unit 21 and one second side antenna unit 321, one forward facing antenna unit 21 is mounted on the mounting surface, in addition, receptacles 6 are disposed on two opposite sides of the forward facing antenna unit 21. One receptacle 6 is disposed on a side on which the second side antenna unit 321 is disposed, and one second side antenna unit 321 is disposed inside the receptacle 6.

Figure 17:
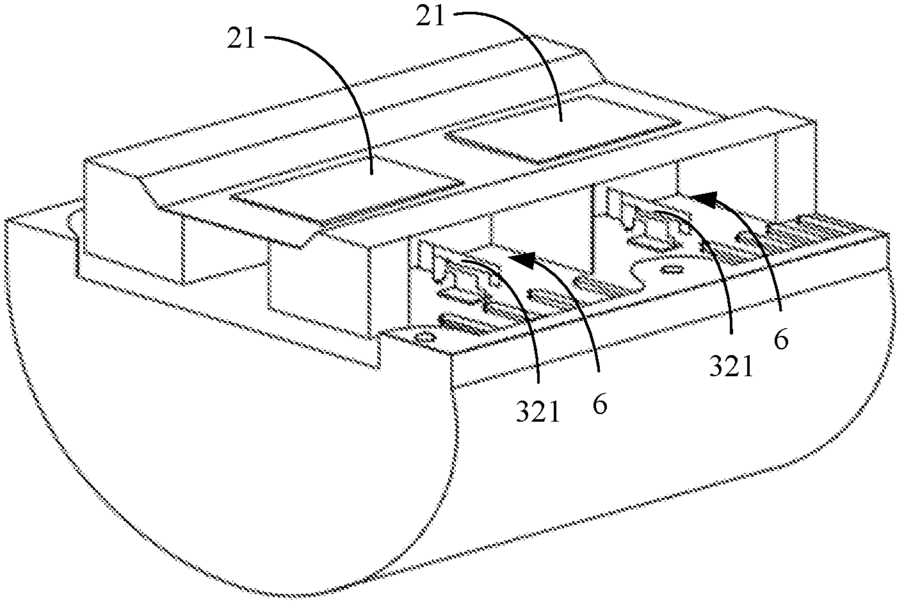
FIG. 17 is a schematic diagram of an internal structure of a quasi-omnidirectional antenna according to an embodiment of this disclosure.

For example, in a structure shown in FIG. 17, when there are two forward facing antenna units 21 and two second side antenna units 321, two forward facing antenna units 21 are mounted on the mounting surface, and the two forward facing antenna units 21 are arranged along an extended columnar direction of the housing 1. In addition, the receptacles 6 are disposed on two opposite sides of the forward facing antenna units 21. Two receptacles 6 are disposed on a side on which the second side antenna units 321 are disposed, and two second side antenna units 321 are disposed inside the receptacles 6.

Figure 18:
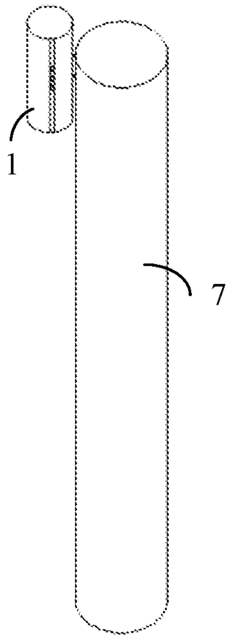
FIG. 18 is a schematic structural diagram of a signal transceiver according to an embodiment of this disclosure.

An embodiment further provides a signal transceiver. The signal transceiver includes a quasi-omnidirectional antenna, where the quasi-omnidirectional antenna is any quasi-omnidirectional antenna in the foregoing technical solutions. In the signal transceiver provided in this embodiment, in a structure shown in FIG. 18, a housing 1 of the quasi-omnidirectional antenna is connected to a mounting kit 7. The mounting kit 7 is shown in a form of a pole. It should be understood that the mounting kit 7 may alternatively be in another structural form, and details are not described herein.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A quasi-omnidirectional antenna, comprising:

a housing having a metal rear cover facing a boundary of an installation area and a front cover disposed opposite to the metal rear cover, wherein the front cover and the metal rear cover form an enclosed structure;

a first mounting plate and a second mounting plate that are disposed inside the housing, wherein the second mounting plate is disposed, by using a support structure, on a first side that is of the first mounting plate and away from the metal rear cover;

a forward facing antenna disposed inside the housing and configured to radiate in a direction away from the metal rear cover; and first and second side antennas disposed inside the housing, the first side antenna and the second side antenna being oppositely disposed on two sides of the forward facing antenna, each side antenna including a metallic ground signal-connected to the metal rear cover so that a radiation area of each side antenna comprises at least a part of an area between the metal rear cover and the boundary of the installation area, there being an overlapping area between the radiation area of each side antenna and a radiation area of the forward facing antenna, wherein the forward facing antenna is formed on a second side that is of the second mounting plate and away from the metal rear cover, and each of the first side antenna and the second side antenna is disposed in a receptacle formed between the second mounting plate and the first mounting plate.

2. The quasi-omnidirectional antenna according to claim 1, each side antenna being a planar inverted F antenna.

3. The quasi-omnidirectional antenna according to claim 2, the metallic ground of each side antenna being lapped to the metal rear cover.

4. The quasi-omnidirectional antenna according to claim 2, the metallic ground of each side antenna being coupled to the metal rear cover.

5. The quasi-omnidirectional antenna according to claim 4, further comprising a gap extending between the metallic ground of each side antenna and the metal rear cover, the gap being less than 1 millimeter such that the metallic ground is signal-connected to the metal rear cover.

6. The quasi-omnidirectional antenna according to claim 2, a radiation angle of the forward facing antenna ranging from 60° to 80°.

7. The quasi-omnidirectional antenna according to claim 2, further comprising a first overlapping area extending formed between a radiation area of the first side antenna and the radiation area of the forward facing antenna, and a second overlapping area extending between a radiation area of the second side antenna and the radiation area of the forward facing antenna, for which:

the first overlapping area is the same as the second overlapping area; or the first overlapping area is different from the second overlapping area.

8. The quasi-omnidirectional antenna according to claim 2, further comprising at least one of the following conditions:

the forward facing antenna comprises at least two forwarding facing antenna units; or each side antenna comprises at least two side antennas.

9. The quasi-omnidirectional antenna according to claim 1, wherein the front cover is made of plastic.

10. A signal transceiver comprising a quasi-omnidirectional antenna, the quasi-omnidirectional antenna comprising:

a housing having a metal rear cover facing a boundary of an installation area and a front cover disposed opposite to the metal rear cover, wherein the front cover and the metal rear cover form an enclosed structure;

a first mounting plate and a second mounting plate that are disposed inside the housing, wherein the second mounting plate is disposed, by using a support structure, on a first side that is of the first mounting plate and away from the metal rear cover;

a forward facing antenna disposed inside the housing and configured to radiate in a direction away from the metal rear cover; and first and second side antennas disposed inside the housing, the first side antenna and the second side antenna being oppositely disposed on two sides of the forward facing antenna, each side antenna including a metallic ground signal-connected to the metal rear cover so that a radiation area of each side antenna comprises at least a part of an area between the metal rear cover and the boundary of the installation area, there being an overlapping area between the radiation area of each side antenna and a radiation area of the forward facing antenna, wherein the forward facing antenna is formed on a second side that is of the second mounting plate and away from the metal rear cover, and each of the first side antenna and the second side antenna is disposed in a receptacle formed between the second mounting plate and the first mounting plate.

11. The signal transceiver according to claim 10, each side antenna being a planar inverted F antenna.

12. The signal transceiver according to claim 11, the metallic ground of each side antenna being lapped to the metal rear cover.

13. The signal transceiver according to claim 11, the metallic ground of each side antenna being coupled to the metal rear cover.

14. The signal transceiver according to claim 13, further comprising a gap extending between the metallic ground of each side antenna and the metal rear cover, the gap being less than 1 millimeter such that the metallic ground is signal-connected to the metal rear cover.

15. The signal transceiver according to claim 11, a radiation angle of the forward facing antenna ranging from 60° to 80°.

16. The signal transceiver according to claim 11, further comprising a first overlapping area extending between a radiation area of the first side antenna and the radiation area of the forward facing antenna, and a second overlapping area extending between a radiation area of the second side antenna and the radiation area of the forward facing antenna, for which:

the first overlapping area is substantially the same as the second overlapping area; or the first overlapping area is different from the second overlapping area.

17. The signal transceiver according to claim 11, the quasi-omnidirectional antenna satisfying at least one of the following conditions:

the forward facing antenna comprises at least two forwarding facing antenna units; or each side antenna comprises at least two side antennas.

18. The signal transceiver according to claim 10, wherein the front cover is made of plastic.

* * * * *